United States Patent
Yang

(10) Patent No.: US 11,615,078 B2
(45) Date of Patent: Mar. 28, 2023

(54) BLOCKCHAIN-BASED TRANSACTION METHODS

(71) Applicants: ALIPAY (HANGZHOU) INFORMATION TECHNOLOGY CO., LTD., Zhejiang (CN); ANT BLOCKCHAIN TECHNOLOGY (SHANGHAI) CO., LTD., Shanghai (CN)

(72) Inventor: Renhui Yang, Hangzhou (CN)

(73) Assignees: Alipay (Hangzhou) Information Technology Co., Ltd., Zhejiang (CN); Ant Blockchain Technology (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 17/580,348

(22) Filed: Jan. 20, 2022

(65) Prior Publication Data
US 2022/0147512 A1    May 12, 2022

(30) Foreign Application Priority Data
Jun. 7, 2021    (CN) .......................... 202110633515.5

(51) Int. Cl.
*G06F 16/23* (2019.01)
*G06F 21/60* (2013.01)
(52) U.S. Cl.
CPC ........ *G06F 16/2379* (2019.01); *G06F 21/602* (2013.01)
(58) Field of Classification Search
CPC .... G06F 16/2379; G06F 21/602; G06F 16/27; H04L 9/3247; H04L 9/3239; H04L 9/50; G06Q 40/04; G06Q 20/389
See application file for complete search history.

(56) References Cited

U.S. PATENT DOCUMENTS

| | | |
|---|---|---|
| 10,102,526 B1 | 10/2018 | Madisetti et al. |
| 10,243,743 B1 | 3/2019 | Madisetti et al. |

(Continued)

FOREIGN PATENT DOCUMENTS

| | | |
|---|---|---|
| CN | 107103473 | 8/2017 |
| CN | 107844978 A | 3/2018 |

(Continued)

OTHER PUBLICATIONS

PCT International Search Report and Written Opinion in International Application No. PCT/CN2022/094327, dated Jul. 27, 2022, 9 pages (Machine translation).

(Continued)

*Primary Examiner* — Albert M Phillips, III
(74) *Attorney, Agent, or Firm* — Fish & Richardson P.C.

(57) ABSTRACT

Blockchain-based transaction methods, apparatuses and systems are provided. A transaction party invokes a smart contract in a blockchain system to register a digital identity on a blockchain for a digital object in the blockchain system and to write an owner identity of the digital object into a digital identity document of the digital object. If one or more transaction counterparties want to obtain ownership of the digital object, they can invoke the smart contract in the blockchain system to initiate a request of a transaction, further invoke the smart contract in the blockchain system to complete a transaction, determine a new owner of the digital object, and update the owner identity of the digital object on the blockchain.

26 Claims, 9 Drawing Sheets

(56) References Cited

U.S. PATENT DOCUMENTS

| | | |
|---|---|---|
| 10,505,726 B1 | 12/2019 | Andon et al. |
| 10,558,955 B2 | 2/2020 | Haldenby et al. |
| 10,708,042 B1 | 7/2020 | Rubenstein et al. |
| 10,789,590 B2 | 9/2020 | Tran et al. |
| 10,938,562 B2 | 3/2021 | Liu et al. |
| 2017/0046664 A1 | 2/2017 | Haldenby et al. |
| 2018/0167198 A1 | 6/2018 | Muller et al. |
| 2018/0262493 A1 | 9/2018 | Andrade |
| 2018/0343126 A1 | 11/2018 | Fallah et al. |
| 2019/0164157 A1 | 5/2019 | Balaraman et al. |
| 2019/0164223 A1 | 5/2019 | de Jong |
| 2019/0394179 A1 | 12/2019 | Androulaki et al. |
| 2020/0005284 A1* | 1/2020 | Vijayan ............... G06Q 20/36 |
| 2020/0145209 A1 | 5/2020 | Yang et al. |
| 2020/0160289 A1* | 5/2020 | Mahajan ............ G06F 16/2379 |
| 2020/0193541 A1 | 6/2020 | Barry et al. |
| 2020/0258159 A1 | 8/2020 | Stradling et al. |
| 2020/0273048 A1* | 8/2020 | Andon ................. H04L 9/0894 |
| 2020/0364699 A1 | 11/2020 | Talmore et al. |
| 2021/0184845 A1 | 6/2021 | Herbert et al. |
| 2021/0248594 A1* | 8/2021 | Yantis ............... G06Q 30/0185 |

FOREIGN PATENT DOCUMENTS

| | | |
|---|---|---|
| CN | 109949033 A | 6/2019 |
| CN | 110049066 | 7/2019 |
| CN | 110266644 A | 9/2019 |
| CN | 108234515 | 7/2020 |
| CN | 109918942 | 7/2020 |
| CN | 111368340 | 7/2020 |
| CN | 108111543 | 8/2020 |
| CN | 111639924 | 9/2020 |
| CN | 111639924 A | 9/2020 |
| CN | 111667350 | 9/2020 |
| CN | 112199446 | 5/2021 |
| CN | 113327165 | 8/2021 |
| JP | 6710401 | 6/2020 |
| KR | 20180068888 | 6/2018 |
| WO | WO2017197110 | 11/2017 |
| WO | WO2018032890 | 2/2018 |
| WO | WO-2020092900 A2 * | 5/2020 ........... G06F 21/602 |
| WO | WO2020150741 | 7/2020 |

OTHER PUBLICATIONS

Crosby et al., "BlockChain Technology: Beyond Bitcoin," Sutardja Center for Entrepreneurship & Technology Technical Report, Oct. 16, 2015, 35 pages.

EP Extended Search Report in European Application No. 21182631.8, dated Dec. 14, 2021, 9 pages.

Khan et al., "Blockchain smart contracts: Applications, challenges, and future trends", Peer-toPeer Networking and Application, Apr. 18, 2021, 25 pages.

Koirala et al., "Supply Chain using Smart Contract: A Blockchain enabled model with Traceability and Ownership Management", 9th International Conference on Cloud Computing, Data Science & Engineering (Confluence), Jan. 10, 2019, 9 pages.

Nakamoto, "Bitcoin: A Peer-to-Peer Electronic Cash System," www.bitcoin.org, 2005, 9 pages.

Mizrahi [online], "A blockchain-based property ownership recording system," Jan. 2015, retrieved on Feb. 2, 2022, retrieved from URL<https://static1.squarespace.com/static/5e26f18cd5824c7138a9118b/t/5e3c1c7d6d5ff061da34da80/1580997757765/A-blockchain-based-property-registry.pdf>, 9 pages.

Patil, "Land Registry on Blockchain", SJSU Scholarworks, May 14, 2020, 90 pages.

tykn.tech [online], "Blockchain Identity Management: The Definitive Guide (2021 Update)," dated May 19, 2021, retrieved Feb. 2, 2022, retreived from URL<https://tykn.tech/identity-management-blockchain/>, 21 pages.

bigchaindb.com [online], "Tutorial: How to create a digital record of a piece of art," dated 2020, retrieved on Feb. 2, 2022, retrieved from URL<https://www.bigchaindb.com/developers/guide/tutorial-piece-of-art/>, 9 pages.

* cited by examiner

BLOCKCHAIN-BASED TRANSACTION METHODS

CROSS-REFERENCE TO RELATED APPLICATIONS

This application claims priority to Chinese Patent Application No. 202110633515.5, filed on Jun. 7, 2021, which is hereby incorporated by reference in its entirety.

TECHNICAL FIELD

A plurality of embodiments of this specification relate to the field of blockchain technologies, and in particular, to blockchain-based transaction methods.

BACKGROUND

Current transaction modes mainly include real-world transactions and online transactions. For real-world transactions, both transaction parties need to actually complete the transactions on site. For online transactions, both transaction parties need to reach a transaction agreement online. Therefore, a more convenient and reliable transaction method is needed, especially a blockchain-based transaction method.

SUMMARY

A plurality of embodiments of this specification provide blockchain-based transaction methods, blockchain systems, and blockchain-based transaction systems.

Technical solutions provided in a plurality of embodiments of this specification are as follows:

According to a first aspect of a plurality of embodiments of this specification, a blockchain-based transaction method is proposed, including:

A client device of a transaction party invokes a smart contract in a blockchain system to register a digital identity for a digital object in the blockchain system, where a digital identity document of the digital object includes an owner identity of the digital object; one or more client devices of one or more transaction counterparties respectively invoke the smart contract in the blockchain system to execute a request of a transaction; and invoke the smart contract in the blockchain system to perform a transaction completion step, determine a new owner of the digital object based on a result of the transaction, and update the owner identity of the digital object included in the digital identity document.

According to a second aspect of a plurality of embodiments of this specification, a blockchain-based transaction method is proposed, including: a client device of a transaction party invokes a smart contract in a blockchain system to register a digital identity for a current owner of a digital object in the blockchain system, where a digital identity document of the current owner records an ownership of the current owner for the digital object; one or more client devices of one or more transaction counterparties respectively invoke the smart contract in the blockchain system to execute a request of a transaction; and invoke the smart contract in the blockchain system to perform a transaction completion step, determine a new owner of the digital object based on a result of the transaction, delete the ownership of the current owner for the digital object from the digital identity document of the current owner, and invoke the smart contract in the blockchain system to write an ownership of a new owner for the digital object into a digital identity document of the new owner.

According to a third aspect of a plurality of embodiments of this specification, a blockchain-based transaction method is proposed, including: a client device of a transaction party invokes a smart contract in a blockchain system to create an association relationship between a digital object in the blockchain system and a current owner of the digital object; one or more client devices of one or more transaction counterparties respectively invoke the smart contract in the blockchain system to execute a request of a transaction; and invoke the smart contract in the blockchain system to perform a transaction completion step, determine a new owner of the digital object based on a result of the transaction, and update the association relationship.

According to a fourth aspect of a plurality of embodiments of this specification, a blockchain system is proposed and applied to the method of the first aspect, the second aspect, or the third aspect.

According to a fifth aspect of a plurality of embodiments of this specification, a blockchain-based transaction system is proposed, including a client device of a transaction party, one or more client devices of one or more transaction counterparties, and a blockchain system; where the client device of the transaction party invokes a smart contract in the blockchain system to register a digital identity for a digital object in the blockchain system, where a digital identity document of the digital object includes an owner identity of the digital object; one or more client devices of the one or more transaction counterparties respectively invoke the smart contract in the blockchain system to execute a request of a transaction; and furthermore, invoke the smart contract in the blockchain system to perform a transaction completion step, determine a new owner of the digital object based on a result of the transaction, and update the owner identity of the digital object included in the digital identity document.

According to a sixth aspect of a plurality of embodiments of this specification, a blockchain-based transaction system is proposed, including a client device of a transaction party, one or more client devices of one or more transaction counterparties, and a blockchain system; where the client device of the transaction party invokes a smart contract in the blockchain system to register a digital identity for a current owner of a digital object in the blockchain system, where a digital identity document of the current owner records an ownership of the current owner for the digital object; one or more client devices of the one or more transaction counterparties respectively invoke the smart contract in the blockchain system to execute a request of a transaction; and furthermore, invoke the smart contract in the blockchain system to perform a transaction completion step, determine a new owner of the digital object based on a result of the transaction, delete the ownership of the current owner for the digital object from the digital identity document of the current owner, and invoke the smart contract in the blockchain system to write an ownership of a new owner for the digital object into a digital identity document of the new owner.

According to a seventh aspect of a plurality of embodiments of this specification, a blockchain-based transaction system is proposed, including a client device of a transaction party, one or more client devices of one or more transaction counterparties, and a blockchain system; where the client device of the transaction party invokes a smart contract in the blockchain system to create an association relationship between a digital object in the blockchain system and a current owner of the digital object; one or more client devices of the one or more transaction counterparties respectively invoke the smart contract in the blockchain system to execute a request of a transaction; and furthermore, invoke the smart contract in the blockchain system to perform a transaction completion step, determine a new owner of the digital object based on a result of the transaction, and update the association relationship.

According to the previous technical solutions, an ownership of an asset to be traded can be recorded in a digital identity document or a smart contract, and an online transaction process of both transaction parties can also be implemented based on a blockchain system. On one hand, both the transaction parties can complete the transaction on the blockchain, which is convenient for both the transaction parties. On the other hand, a record of each step in the transaction process is stored on the blockchain, and it is difficult to tamper with the record. Both the transaction parties can hardly deny a transaction agreement, and therefore the transaction agreement is relatively reliable.

DESCRIPTION OF EMBODIMENTS

Figure 1:
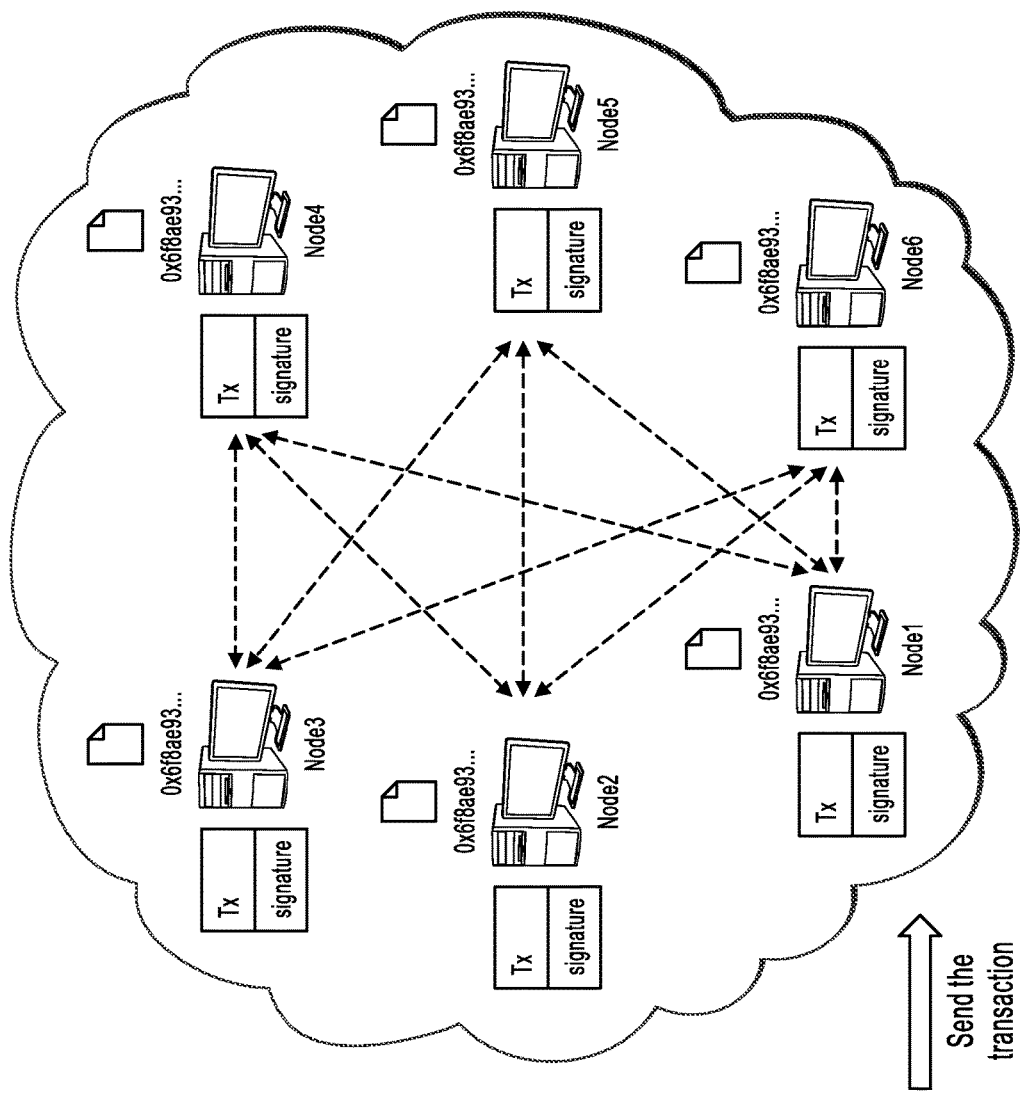
FIG. 1 is a schematic diagram of creating a smart contract, according to an example embodiment.
Figure 1:
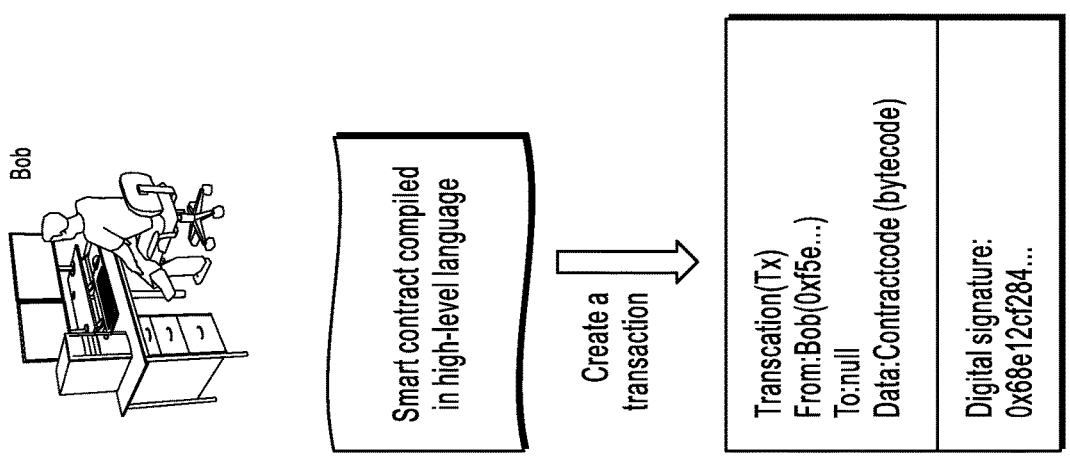

To make a person skilled in the art better understand the technical solutions in this specification, the following clearly and comprehensively describes the technical solutions in the embodiments of this specification with reference to the accompanying drawings in the embodiments of this specification. Clearly, the described embodiments are merely some rather than all of the embodiments of this specification. All other embodiments obtained by a person of ordinary skill in the art based on the embodiments of this specification without creative efforts shall fall within the protection scope of this specification.

It is worthwhile to note that, in other embodiments, steps of a corresponding method are not necessarily performed based on a sequence shown and described in this specification. In some other embodiments, the method can include more or less steps than those described in this specification.

In addition, a single step described in this specification may be broken down into multiple steps in other embodiments for description. However, the multiple steps described in this specification may also be combined into a single step for description in other embodiments.

In some embodiments of this specification, transaction participants include at least two parties, where one party participating in a transaction is referred to as a transaction party, and the other party participating in the transaction is referred to as a transaction counterparty. There can be one or more transaction parties. There can be also one or more transaction counterparties. The quantity of transaction parties and transaction counterparties can be freely combined based on transaction requirements.

In some embodiments of this specification, a digital identity is used to record and verify ownership and a transaction result of a digital object. The digital object is a digital proof representing a transaction object such as a physical asset, a digital work, a property interest, etc., for example, a non-fungible token. The digital identity is a digital identity proof, and generally refers to features other than the digital object itself. For example, a decentralized identifier is implemented based on a distributed system (usually a blockchain system), and constituent elements of the decentralized identifier include at least a digital identifier and a digital identity document. By combining the digital object with the digital identifier and a record and verification function attached to the digital identity document, transaction elements such as a transaction object and transaction participants can be easily recorded and verified, thereby improving transaction convenience and reliability.

In some embodiments of this specification, a transaction party invokes a smart contract in a blockchain system to register a digital identity for a digital object, so the digital object correspondingly has a trusted identity, and a related digital identity document records trusted identity information. In some other embodiments of this specification, a transaction party invokes a smart contract in a blockchain system to register a digital identity for a current owner of a digital object, so the owner has a trusted digital identity, and a related digital identity document can also correspondingly record trusted identity information. Generally, registering the digital identity is to associate the digital object with the digital identity, so the digital object has a corresponding identity. In some embodiments of this specification, the digital identity can adopt a currently popular on-chain digital identity specification, that is, a decentralized identifier. In addition, in some other embodiments of this specification, other digital identity specifications can also be used. In some embodiments of this specification, some or all digital identities meet regulatory requirements of Know Your Customer (KYC), including real-name authentication. In some embodiments, all digital identities are real-name authenticated.

In some embodiments of this specification, instead of relying on the digital identity, a client device of a transaction party invokes a smart contract in a blockchain system to create an association relationship table between a digital object and its owner on a blockchain, stores the association relationship table in the smart contract, and further records ownership of the digital object on the blockchain in a trusted method.

This specification provides the following examples of technical solutions:

Technical Solution 1:

A transaction party invokes a smart contract in a blockchain system, can register a digital identity on a blockchain for a digital object in the blockchain system, and write an owner identity of the digital object into a digital identity document of the digital object, which is equivalent to trustworthy recording of ownership of the digital object on the blockchain.

If one or more transaction counterparties want to obtain the ownership of the digital object, they can invoke the smart contract in the blockchain system to initiate a request of a transaction.

As such, the smart contract in the blockchain system can be invoked to complete a transaction, determine a new owner of the digital object based on a result of the transaction, and update a record of the ownership of the digital object on the blockchain.

Technical Solution 2:

A transaction party invokes a smart contract in a blockchain system, can register a digital identity on a blockchain for a current owner of a digital object in the blockchain system, and can write an ownership of the digital object into a digital identity document identified of a current owner identity, which is equivalent to trustworthy recording of ownership of the digital object on the blockchain.

If one or more transaction counterparties want to obtain the ownership of the digital object, they can invoke the smart contract in the blockchain system to initiate a request of a transaction.

As such, the smart contract in the blockchain system can be invoked to complete a transaction, determine a new owner of the digital object based on a result of the transaction, and update a record of the ownership of the digital object on the blockchain.

Technical Solution 3:

A transaction party invokes a smart contract in a blockchain system and can create an association relationship between a digital object and a current owner of the digital object on a blockchain, which is equivalent to trustworthy recording of ownership of the digital object on the blockchain.

If one or more transaction counterparties want to obtain the ownership of the digital object, they can invoke the smart contract in the blockchain system to initiate a request of a transaction.

As such, the smart contract in the blockchain system can be invoked to complete a transaction, determine a new owner of the digital object based on a result of the transaction, and update a record of the ownership of the digital object on the blockchain.

It can be understood from the previous technical solutions that for ownership of an asset to be traded, ownership and circulation of the digital object can be recorded in the digital identity (for example, a decentralized identifier) document; or a trustworthy record can be obtained on the blockchain in a method such as recording and updating the ownership table of the digital object in the smart contract, and an online transaction process of both transaction parties can also be implemented based on the blockchain system. On one hand, both the transaction parties can complete the transaction on the blockchain, which is convenient for both the transaction parties. On the other hand, a record of each step in the transaction process is stored on the blockchain, and it is difficult to tamper with the record, which is therefore trustworthy. Both the transaction parties can hardly deny a transaction agreement, and therefore the transaction agreement is relatively reliable. In addition, it is also difficult for other transaction counterparties who participate in the transaction but do not obtain the ownership of the asset to object to a transaction result.

The following first describes a blockchain technology.

A blockchain is generally classified into three types: a public blockchain, a private blockchain, and a consortium blockchain. In addition, there are several types of combinations, such as private blockchain+consortium blockchain and consortium blockchain+public blockchain. The public blockchain has the highest degree of de-centralization. The public blockchain is represented by Bitcoin and Ethereum. Participants who join the public blockchain can read on-chain data records, participate in transactions, and compete for data recording rights of new blocks. Furthermore, each participant (i.e., node) can freely join and exit the system and perform related operations. On the contrary, a writing right of the private blockchain system is controlled by a certain organization or institution, and a data reading right is specified by the organization. In short, the private blockchain can be a weak centralized system, and participating nodes are strictly limited and rare. This type of blockchain is more suitable for internal use within a specific organization. The consortium blockchain is a blockchain balanced between the public blockchain and the private blockchain, and can be "partially decentralized". Each node in the consortium blockchain usually has a corresponding entity institution or organization. Participants join the system through authorization and form interest-related consortiums to jointly maintain blockchain operation.

All of the public blockchain, the private blockchain, and the consortium blockchain may provide functions of a smart contract. The smart contract on the blockchain is a contract that can be triggered by a transaction (usually initiated by a client device) on the blockchain system for execution. The smart contract is defined in the form of codes.

It is worthwhile to note here that, in the blockchain field, a request submitted to a blockchain system for invoking a smart contract has a data structure specified in a blockchain protocol, which is usually referred to as a transaction. A blockchain transaction is a data structure, but a "transaction" in the blockchain-based transaction method described in each embodiment of this specification refers to a transaction activity. A person skilled in the art can distinguish between the two transaction representations in terms of meanings.

For example, Ethereum allows a user to create and invoke complex logic in an Ethereum system, which is the biggest challenge to distinguish Ethereum from bitcoin blockchain technology. An Ethereum virtual machine (EVM) is the core of Ethereum, which is a programmable blockchain, and each Ethereum node can run the EVM. The EVM is a Turing-complete virtual machine, through which various complex logics can be implemented. The user broadcasts and invokes the smart contract actually on the EVM in Ethereum. In fact, the virtual machine directly runs a virtual machine code (virtual machine bytecode, "bytecode" for short). A smart contract deployed on a blockchain can be in the form of a bytecode.

As shown in FIG. 1, after "Bob" sends a transaction containing information about creating a smart contract to an Ethereum system, an EVM of node 1 can execute the transaction and generate a corresponding contract instance. In FIG. 1, "0x6f8ae93 . . . " represents an address of the contract. The "data" field of the transaction can save a bytecode. The "to" field of the transaction is null. After consensus is reached between nodes through a consensus mechanism, the contract is successfully created and can be invoked in a subsequent process. After the contract is created, a contract account corresponding to the smart contract appears on the blockchain and has a specific address, and a contract code is stored in the contract account. The behavior of the smart contract is controlled by the contract code.

Figure 2:
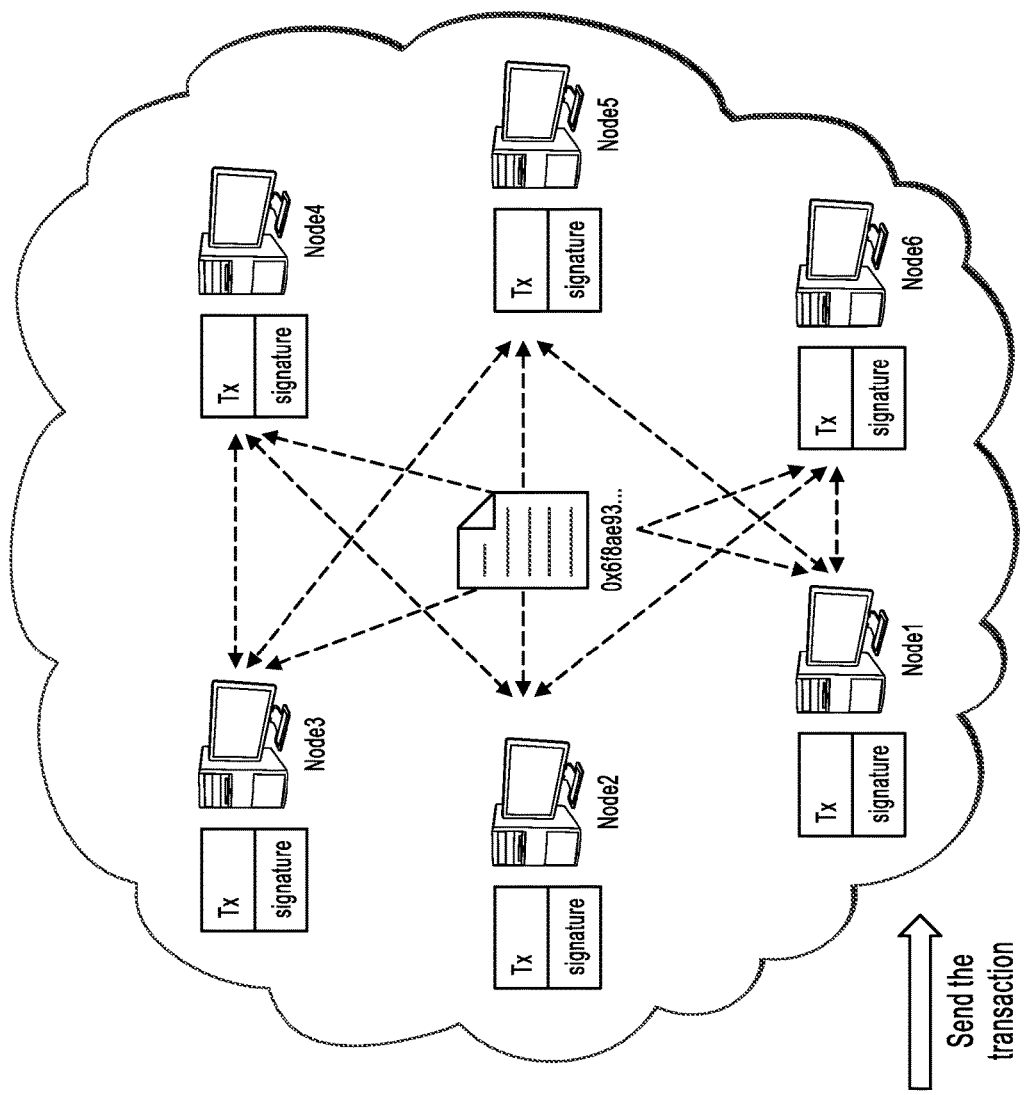
FIG. 2 is a schematic diagram of invoking a smart contract, according to an example embodiment.
Figure 2:
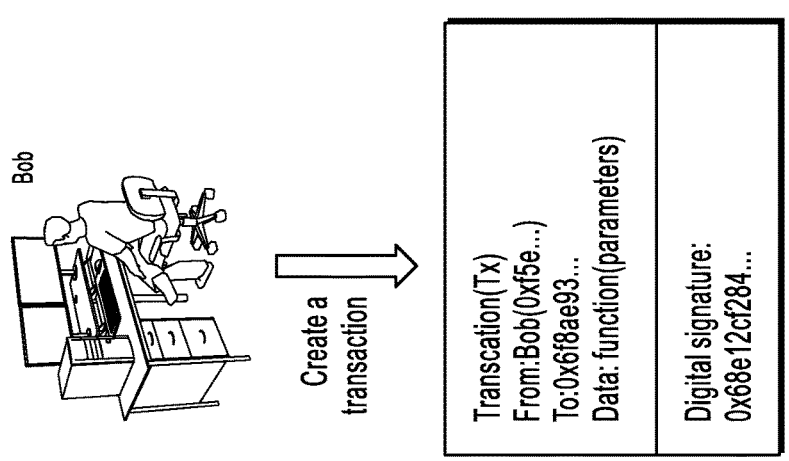

As shown in FIG. 2, Ethereum is still used as an example. After "Bob" sends a transaction for invoking a smart contract to an Ethereum system, an EVM of anode can execute the transaction and generate a corresponding contract instance. In FIG. 2, the "from" field of the transaction is an address of an account of a transaction initiator (that is, "Bob"), "0x6f8ae93 . . . " in the "to" field represents an address of the invoked smart contract, the "value" field is an ETH value in Ethereum, and the "data" field of the transaction stores a method and a parameter for invoking the smart contract. After the smart contract is invoked, the value of balance may change. Subsequently, a client device can view the current value of balance through a blockchain node (for example, node 6 in FIG. 2). The smart contract is executed independently on each node in the blockchain system in a specified method, and all execution records and data are stored in the blockchain. Therefore, after a transaction is completed, transaction proofs that cannot be tampered with and will not be lost are stored in the blockchain.

Figure 3:
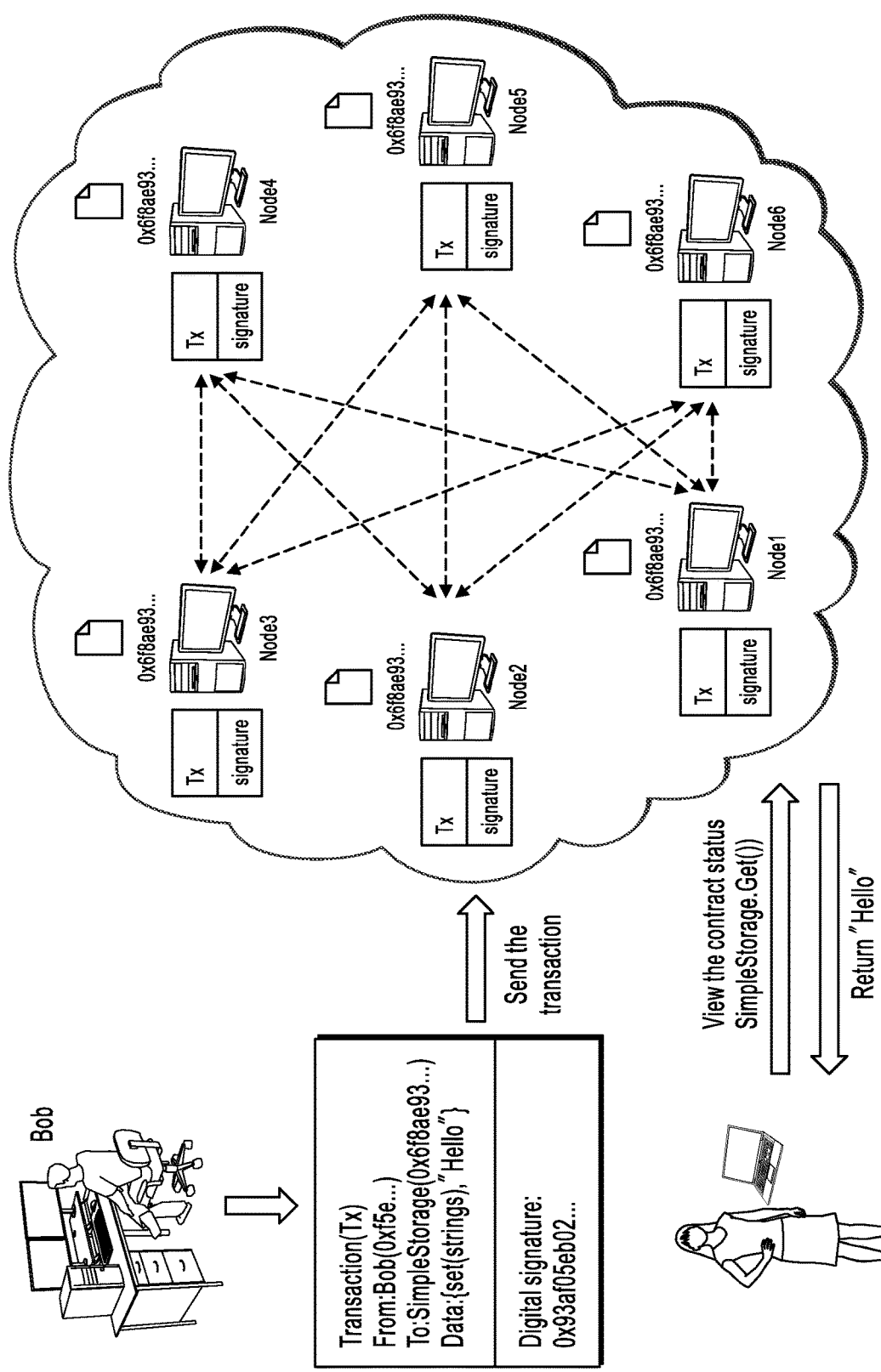
FIG. 3 is a schematic diagram of creating and invoking a smart contract, according to an example embodiment.

A schematic diagram of creating and invoking a smart contract is shown in FIG. 3. Creating a smart contract in Ethereum requires the following processes such as: compiling the smart contract, compiling the smart contract into bytecodes, and deploying the bytecodes to the blockchain. Invoking a smart contract in Ethereum means initiating a transaction directed to an address of the smart contract. Smart contract codes are distributed on a virtual machine of each node in the Ethereum system.

It is worthwhile to note that, in addition to creating a smart contract by a user, a smart contract can be set in a genesis block by a system. Such a contract is generally referred to as a genesis contract. Generally, data structures, parameters, attributes, and methods of some blockchain systems can be set in a genesis contract. In addition, an account with a system administrator authority can create a system-level contract or modify a system-level contract (referred to as a system contract). In addition to the EVM in Ethereum, different blockchain systems may also use various virtual machines. This is not limited here.

After a node in a blockchain system executes a transaction for invoking a smart contract, a corresponding receipt is generated to record information related to execution of the smart contract. As such, information about a contract execution result can be obtained by querying a receipt of a transaction. The contract execution result can be an event in the receipt. A message mechanism can implement message transfer by using an event in a receipt, so as to trigger a blockchain node or a node device deployed on the blockchain node to perform corresponding processing. A structure of the event can be, for example, Event:
[topic][data]
[topic][data]
. . .

In the previous example, there can be one or more events. Each event includes fields such as topic and data. The blockchain node or the node device deployed on the blockchain node can monitor the topic of the event, so when a predefined topic is monitored, predetermined processing is performed, or related content is read from the data field of the corresponding event, and predetermined processing can be performed based on the read content.

In the previous event mechanism, it is equivalent to that a client device that has a monitoring function exists at a monitoring party (for example, a user that has a monitoring requirement), for example, a software development kit (SDK) used to implement a monitoring function runs on the client device, the client device monitors an event generated by a blockchain node, and the blockchain node only needs to normally generate a receipt. In addition to the previous event mechanism, transaction information can be released in other methods. For example, a monitoring code can be embedded in a blockchain platform code running on the blockchain node, so the monitoring code can monitor one or more pieces of data such as transaction content of a blockchain transaction, a contract status of a smart contract, a receipt generated by a contract, etc., and send the monitored data to a predefined monitoring party. Because the monitoring code is deployed in the blockchain platform code rather than the client device of the monitoring party, this implementation based on the monitoring code is more proactive than the event mechanism. The monitoring code can be added to the blockchain platform code by a developer of the blockchain platform in a development process, or can be embedded by the monitoring party based on its needs. This is not limited in this specification.

One of the features that distinguish the blockchain technology from de-centralization of a conventional technology is that data recording is performed on each node, or is referred to as distributed ledger rather than conventional centralized ledger. To become a hard-to-attack, open, and decentralized honest and trustworthy system whose data records cannot be tampered with, a blockchain system needs to ensure security, clarity, and immutability of distributed data records in the shortest possible time. In blockchain systems of different types, to maintain ledger consistency among nodes that keep ledgers, a consensus algorithm is usually used, that is, the consensus mechanism mentioned above. For example, a consensus mechanism at a block granularity can be implemented between blockchain nodes, for example, after a node (for example, a unique node) generates a block, if the generated block is acknowledged by other nodes, the other nodes record the same block. For another example, a consensus mechanism at a transaction granularity can be implemented between blockchain nodes, for example, after a node (for example, a unique node) obtains a blockchain transaction, if the blockchain transaction is acknowledged by other nodes, each node that acknowledges the blockchain transaction can respectively add the blockchain transaction to the latest block maintained by the node, and finally can ensure that each node generates the same latest block. The consensus mechanism is a mechanism in which blockchain nodes reach consensus on block information (or referred to as block data) throughout the network, so as to ensure that the latest block is accurately added to the blockchain. Current mainstream consensus mechanisms include: Proof of Work (POW), Proof of Stake (POS), Delegated Proof of Stake (DPOS), Practical Byzantine Fault Tolerance (PBFT) algorithm, HoneyBadgerBFT algorithm, etc.

Figure 4A:
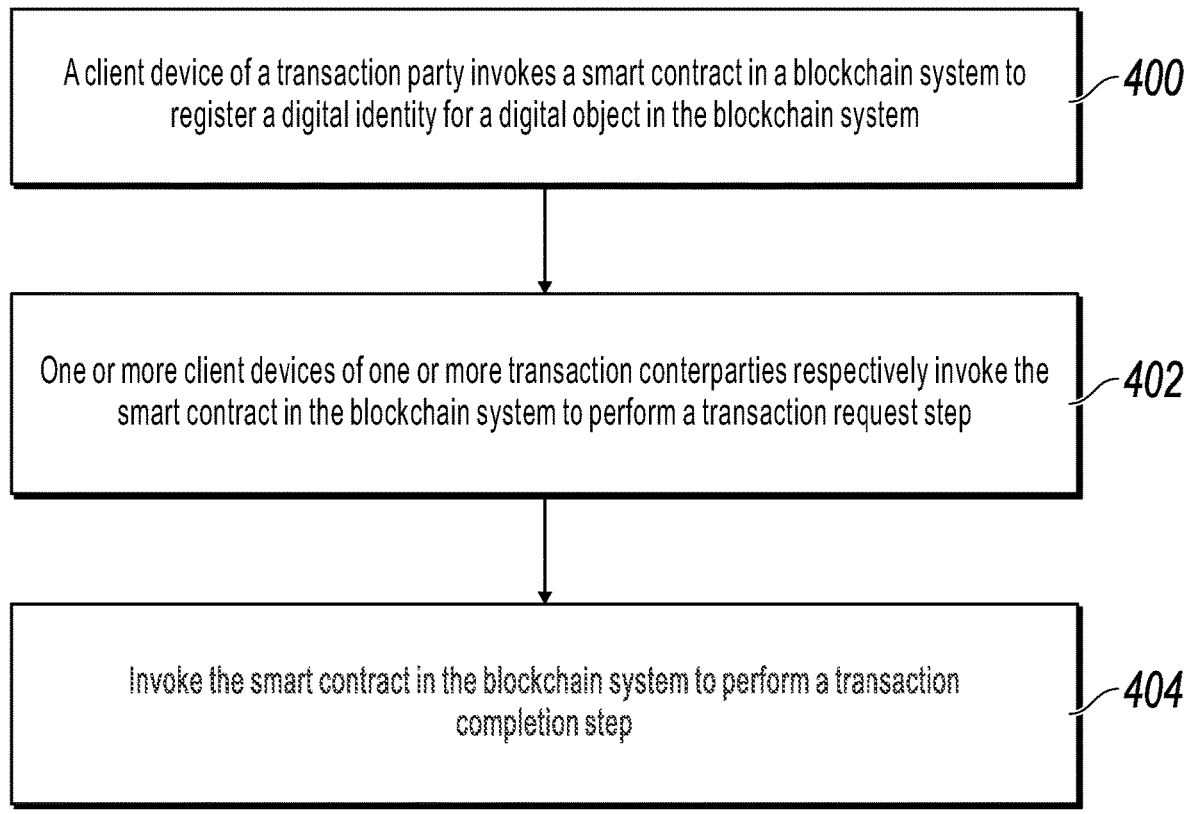
FIG. 4a is a schematic flowchart illustrating a blockchain-based transaction method, according to an example embodiment.

FIG. 4a is a schematic flowchart illustrating a blockchain-based transaction method, according to this specification. The transaction can be a variety of transaction activities that may occur in practice, including but not limited to sale, gifting, and auction. A process of the transaction method can include:

S400. A client device of a transaction party invokes a smart contract in a blockchain system to register a digital identity for a digital object in the blockchain system.

The digital object described here refers to an on-chain digital object issued in the blockchain system.

In some embodiments, the digital object can be defined by using a currently relatively popular digital object protocol (ERC721), and is commonly referred to as a non-fungible token (NFT). In addition, other digital object protocols can be used to define the digital object.

In some embodiments, the smart contract in the blockchain system can be pre-invoked to issue the digital object on the blockchain. An entity that invokes the smart contract to issue the digital object can be the transaction party.

Further, that the client device of the transaction party invokes the smart contract in the blockchain system to issue the digital object on the blockchain can specifically include: If it is determined that a signature submitted by the client device of the transaction party for invoking the smart contract in the blockchain system to issue the digital object on the blockchain has passed verification, issuing the digital object on the blockchain.

As described above, the digital identity registered for the digital object by the transaction party by invoking the smart contract in the blockchain system can be understood as a trusted identity of the digital object on the blockchain. The digital identity generally has a digital identity document, and the digital identity document generally records trusted identity certificate information. In some embodiments, a currently relatively popular on-chain digital identity specification, that is, a decentralized ID (DID) can be used. In addition, other on-chain digital identity specifications can be used. For example, a decentralized identifier is a digital identity proof implemented based on a distributed system (usually a blockchain system), and constituent elements of the decentralized identifier include at least a digital identifier and a digital identity document. In some embodiments of this specification, the transaction party invokes the smart contract in the blockchain system to register the digital identity (for example, a decentralized identifier) for the digital object, so the digital object correspondingly has a trusted identity, and a related digital identity document can further record an owner identity of the digital object.

For more information about digital identity technologies, refer to the published Patent Documents U.S. Pat. No. 10,938,562 and US2020/0145209, which are incorporated here by reference in their entireties.

It is worthwhile to note that the transaction party may not be the same party as the owner of the digital object, and the transaction party can be a transaction agent that acts on behalf of the owner for executing a transaction.

In some embodiments, there can be an anchor relationship between an on-chain digital object and an off-chain transaction object. That is, ownership of the off-chain transaction object is subject to ownership of the on-chain digital object. As such, a transaction of the off-chain transaction object can be indirectly implemented by using a transaction pattern of the on-chain digital object, the on-chain digital object and the off-chain transaction object are anchored, and the ownership of the on-chain digital object is mapped to the ownership of the off-chain transaction object.

The transaction object described here refers to an object of a transaction activity, and can be a physical asset, a digital work (for example, a digital music work), a property interest, etc. The client device described here refers to a client device of the blockchain system, also referred to as a blockchain client device. The blockchain client device may be a node of the blockchain system (e.g., in the case of a public blockchain system) or may not be a node of the blockchain system (e.g., in the case of a consortium blockchain). The blockchain client device can invoke the smart contract in the blockchain system, so the smart contract in the blockchain system executes recorded code logic by using parameters specified when the client device invokes the smart contract as inputs.

It is worthwhile to note that the client device can be a specific application program, or can be an SDK embedded into the application program. The client device is usually developed by a maintenance party of the blockchain system and provided for a user to use.

The blockchain system described here can include one or more blockchain systems or can be a single blockchain system.

It is worthwhile to note that smart contracts can be respectively deployed in different blockchain systems. For example, a smart contract deployed in a first blockchain system can be used to issue a digital object, and a smart contract deployed in a second blockchain system can be used to register a digital identity. A smart contract used to perform a transaction completion step can be deployed in the first blockchain system or the second blockchain system. Different blockchain systems in the blockchain systems can interact with each other across blockchains, and smart contracts in different blockchain systems can be invoked across blockchains. Certainly, the same blockchain system can also be deployed with smart contracts for issuing a digital object, registering a digital identity, and transaction execution.

In some embodiments, only one smart contract can be deployed in the blockchain system, and the smart contract is used to perform the steps involved in the method shown in FIG. 4a.

In some embodiments, more than one smart contract can be deployed in the blockchain system. These smart contracts share different steps in the method shown in FIG. 4a. Specifically, one smart contract can be corresponding to one step. In this case, when a smart contract performs a step, if a function of another smart contract needs to be used, the another smart contract can be invoked in an inter-contract invoking method for corresponding processing, and a result returned by the another smart contract is obtained.

For example, the step of registering a digital identity in the method and the step of executing a request of a transaction shown in FIG. 4a can be performed by different smart contracts.

In addition, when more than one step is performed by invoking the smart contract in the blockchain system, execution of these steps can be triggered by a one-time invoking, or can be triggered by multiple times of invoking. For example, the client device of the transaction party can first invoke the smart contract for one time in the blockchain system to issue the digital object, and then invoke the smart contract for another time in the blockchain system to register the digital identity for the digital object. Or, the smart contract in the blockchain system can be invoked for one time to issue a digital object and register a digital identity for the digital object.

In conclusion, in the descriptions of this specification, "invoking the smart contract in the blockchain system for execution . . . " can include a plurality of cases, which can be that: invoking the smart contract for one time in the blockchain system to perform more than one step, invoking more than one smart contract in the blockchain system to perform one step, invoking more than one smart contract in the blockchain system to perform more than one step, invoking one smart contract in the blockchain system to perform one step, etc.

S402. One or more client devices of one or more transaction counterparties respectively invoke the smart contract in the blockchain system to perform a transaction request step.

In some embodiments, that the smart contract performs a transaction request step can include: if it is determined that the transaction counterparty has a transaction request qualification for the digital object, determining a request of a transaction of the transaction counterparty for the digital object. In some other embodiments, when the smart contract performs a transaction request step, there can be no qualification limitation on the request of the transaction.

In some embodiments, whether the transaction counterparty has the transaction request qualification for the digital object can be determined at any time by the transaction party itself.

In some embodiments, a qualification review rule can be set in advance in the smart contract in the blockchain system to determine whether a transaction counterparty has the transaction request qualification. The smart contract can determine that a request of a transaction initiated by a transaction counterparty having the transaction request qualification is valid, and that a request of a transaction initiated by a transaction counterparty not having the transaction request qualification is invalid.

In some embodiments, it is determined whether a time at which a client device of each transaction counterparty invokes the smart contract in the blockchain system to execute a request of a transaction is within a transaction period; if yes, it is determined that the transaction counterparty has the transaction request qualification for the digital object; and if no, it is determined that the transaction counterparty does not have the transaction request qualification for the digital object. The transaction period can be specified by the transaction party based on actual situations.

In some embodiments, to invoke the smart contract in the blockchain system to perform the transaction request step, the transaction counterparty can provide qualification review information, and qualification is reviewed by the smart contract based on a built-in qualification review rule. Specifically, the transaction counterparty can be required to meet certain qualifications (for example, the account balance reaches a certain amount, the age is above a certain age, and the transaction counterparty comes from which region). In practice, a condition for the transaction counterparty to have the transaction request qualification can be flexibly set based on needs.

S404. Invoke the smart contract in the blockchain system to perform a transaction completion step.

That the smart contract performs the transaction completion step in the method shown in FIG. 4a can include: determining a new owner of the digital object based on a result of the transaction, and updating the owner identity of the digital object included in the digital identity document. In other words, the owner identity of the digital object in the digital identity document of the digital object can be replaced with the identity of the determined new owner.

In the various embodiments of the method shown in FIG. 4a, the transaction completion step can be performed by the client device of the transaction party by invoking the smart contract in the blockchain system. If the transaction party is not the same as the owner of the digital object, the client device of the owner can invoke the smart contract in the blockchain system to perform the transaction completion step, in addition to that the client device of the transaction party invokes the smart contract in the blockchain system to perform the transaction completion step.

In some embodiments, a request of a transaction that meets a requirement can be selected from requests of transactions, and a transaction counterparty corresponding to the selected request of a transaction is determined as a new owner of the digital object. The requirement can be specified by the owner of the digital object, or can be specified by the transaction party.

In some other embodiments, when performing the transaction request step, the smart contract can further trigger an event message corresponding to the request of the transaction.

The client device of the owner can notify monitored event messages respectively corresponding to the request of the transaction to the owner, and determine a transaction counterparty specified by the owner; and invoke the smart contract in the blockchain system to perform the transaction completion step based on the determining result. Or the client device of the transaction party can notify monitored event messages respectively corresponding to requests of transactions to the transaction party, and determine a transaction counterparty specified by the transaction party; and invoke the smart contract in the blockchain system to perform the transaction completion step based on the determining result.

Further, when the client device of the owner invokes the smart contract in the blockchain system to execute transaction completion, a public key of the owner can be used to verify a signature submitted by the client device of the owner to invoke the smart contract in the blockchain system to perform the transaction completion step. If the verification succeeds, the transaction counterparty specified by the determining result can be determined as a new owner of the digital object. If the verification fails, the transaction counterparty specified by the determining result may not be determined as a new owner of the digital object.

The public key of the owner can be included in the digital identity document of the digital object, or can be included in the digital identity document of the owner (the client device of the owner can pre-invoke the smart contract in the blockchain system to register the digital identity of the owner).

Further, when the client device of the transaction party invokes the smart contract in the blockchain system to complete transaction execution, a public key of the transaction party can be used to verify a signature submitted by the client device of the transaction party to invoke the smart contract in the blockchain system to perform the transaction completion step. If the verification succeeds, the transaction counterparty specified by the determining result can be determined as a new owner of the digital object. If the verification fails, the transaction counterparty specified by the determining result may not be determined as a new owner of the digital object.

The public key of the transaction party can be included in the digital identity document of the digital object, or can be included in the digital identity document of the transaction party (the client device of the transaction party can pre-invoke the smart contract in the blockchain system to register the digital identity of the transaction party).

In addition, in some embodiments, the client device of each transaction counterparty can respectively pre-invoke the smart contract in the blockchain system to register a digital identity of the transaction counterparty. The digital identity document of the transaction counterparty can include a transaction counterparty public key of the transaction counterparty.

In some embodiments, when determining whether the transaction counterparty has the transaction request qualification, the smart contract can verify, by using the transaction counterparty public key included in the digital identity document of the transaction counterparty, a signature submitted by the client device of the transaction counterparty to invoke the smart contract in the blockchain system to execute the request of the transaction. If the verification succeeds, it is determined that the transaction counterparty has the transaction request qualification for the digital object; or if the verification fails, it is determined that the transaction counterparty does not have the transaction request qualification for the digital object.

In some embodiments, the client device of transaction party can invoke the smart contract in the blockchain system to set the digital object to a tradable state or a non-tradable state. As such, when the transaction request step is performed, if the digital object is set to the tradable state, it can be determined that the transaction counterparty has the transaction request qualification for the digital object; and if the digital object is set to the non-tradable state, it can be determined that the transaction counterparty does not have the transaction request qualification for the digital object.

Further, in the step that the client device of the transaction party invokes the smart contract in the blockchain system to set the digital object to the tradable state or the non-tradable state, a signature submitted by the client device of the transaction party to invoke the smart contract in the blockchain system to perform an asset management step. If the verification succeeds, the digital object is set to the tradable state or the non-tradable state. If the verification fails, the state of the digital object is not configured.

Figure 4B:
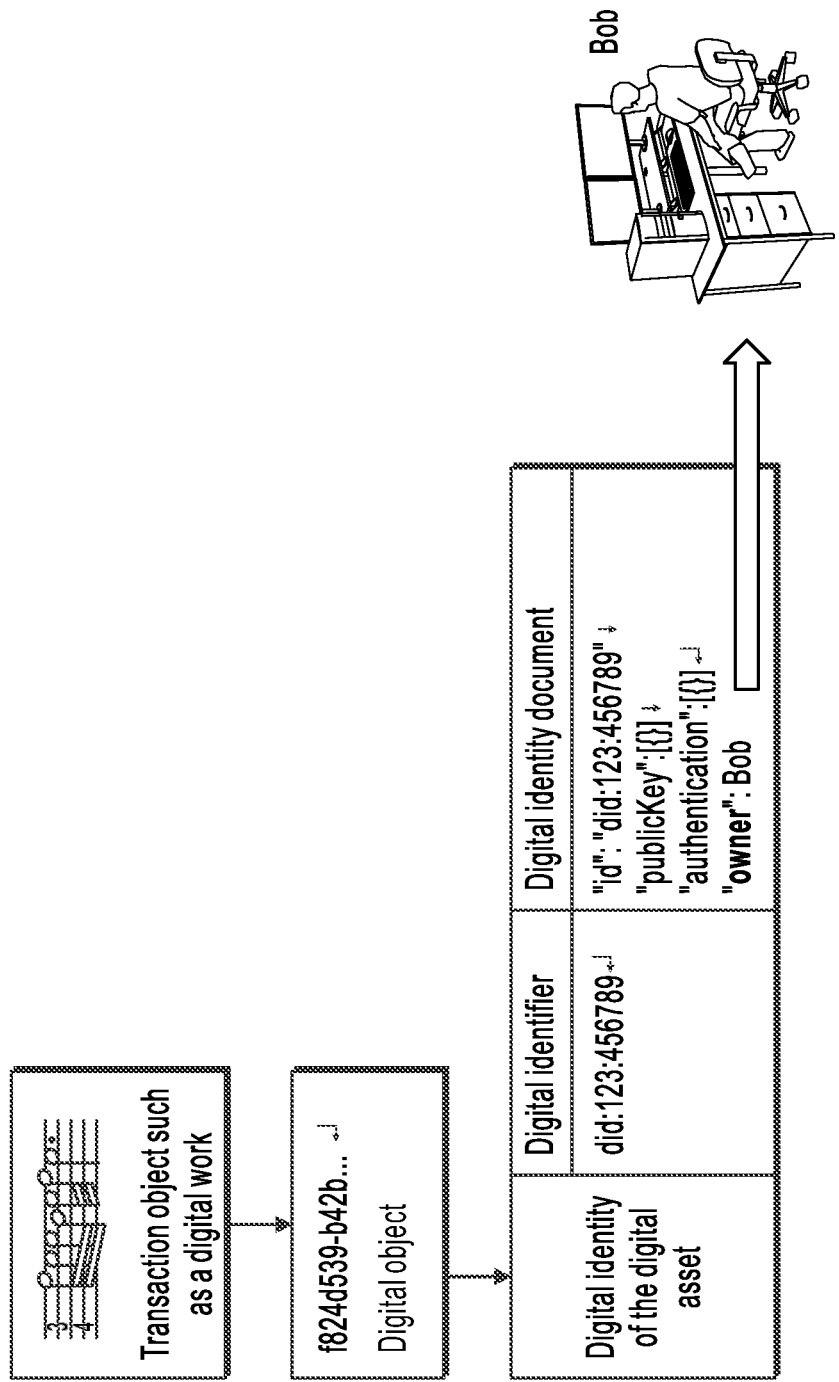
FIG. 4b is a schematic diagram of associating a digital identity of a digital object with its ownership, according to an example embodiment.

FIG. 4b is a schematic diagram of associating a digital identity of a digital object with its ownership, according to an example embodiment. As shown in FIG. 4b, a transaction object such as a digital work is represented as a digital object f824d539-b42b . . . in a blockchain system, and the digital object is further registered with a digital identifier whose digital identity is "did: 123:456789". In addition to recording several pieces of information related to the digital identity (such as a digital identifier, a public key, and identity authentication information) in a corresponding digital identity document, an owner of the digital object is recorded in an "owner" field of the digital identity document, that is, "Bob". The value of the "owner" field will be correspondingly updated with a result of the transaction to record the most recent owner of the digital object.

Figure 5A:
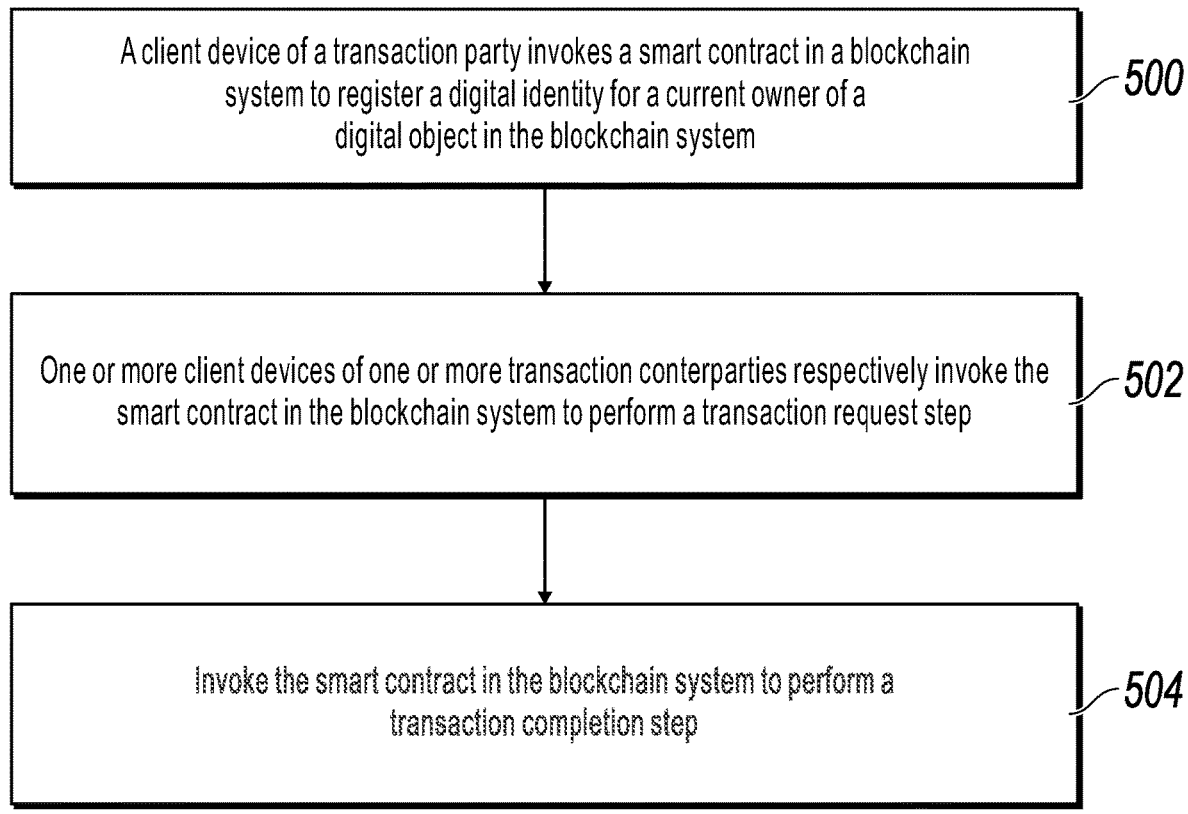
FIG. 5a is a schematic flowchart illustrating another blockchain-based transaction method, according to an example embodiment.

FIG. 5a is a schematic flowchart illustrating another blockchain-based transaction method, according to this specification, including:

S500: A client device of a transaction party invokes a smart contract in a blockchain system to register a digital identity for a current owner of a digital object in the blockchain system.

A digital identity document of the current owner records an ownership of the current owner for the digital object.

S502. One or more client devices of one or more transaction counterparties respectively invoke the smart contract in the blockchain system to perform a transaction request step.

In some embodiments, that the smart contract performs a transaction request step can include: if it is determined that the transaction counterparty has a transaction request qualification for the digital object, determining a request of a transaction of the transaction counterparty for the digital object. In some other embodiments, when the smart contract performs a transaction request step, there can be no qualification limitation on the request of the transaction.

S504. Invoke the smart contract in the blockchain system to perform a transaction completion step.

In some embodiments, the performing a transaction completion step can include: determining a new owner of the digital object based on a result of the transaction, and deleting the ownership of the current owner for the digital object from the digital identity document of the current owner; and writing an ownership of the new owner for the digital object into a digital identity document of the new owner.

A main difference between the method shown in FIG. 5a and the method shown in FIG. 4a lies in that in the method shown in FIG. 5a, the digital identity may not be registered for the digital object, but the digital identity is registered for the current owner of the digital object, and the ownership of the digital object is written into the digital identity document of the current owner. When the transaction completion step is performed, the ownership is deleted from the digital identity document of the current owner, and the ownership is written into the digital identity document of the new owner, so as to complete ownership transfer of the digital object.

In addition to the previous main difference, the previous description of the method shown in FIG. 4a is also applicable to the method shown in FIG. 5a. Principles of the embodiments of the method shown in FIG. 5a are similar to those of the embodiments of the method shown in FIG. 4a. For details, references can be made for understanding, and details are omitted here for simplicity.

Figure 5B:
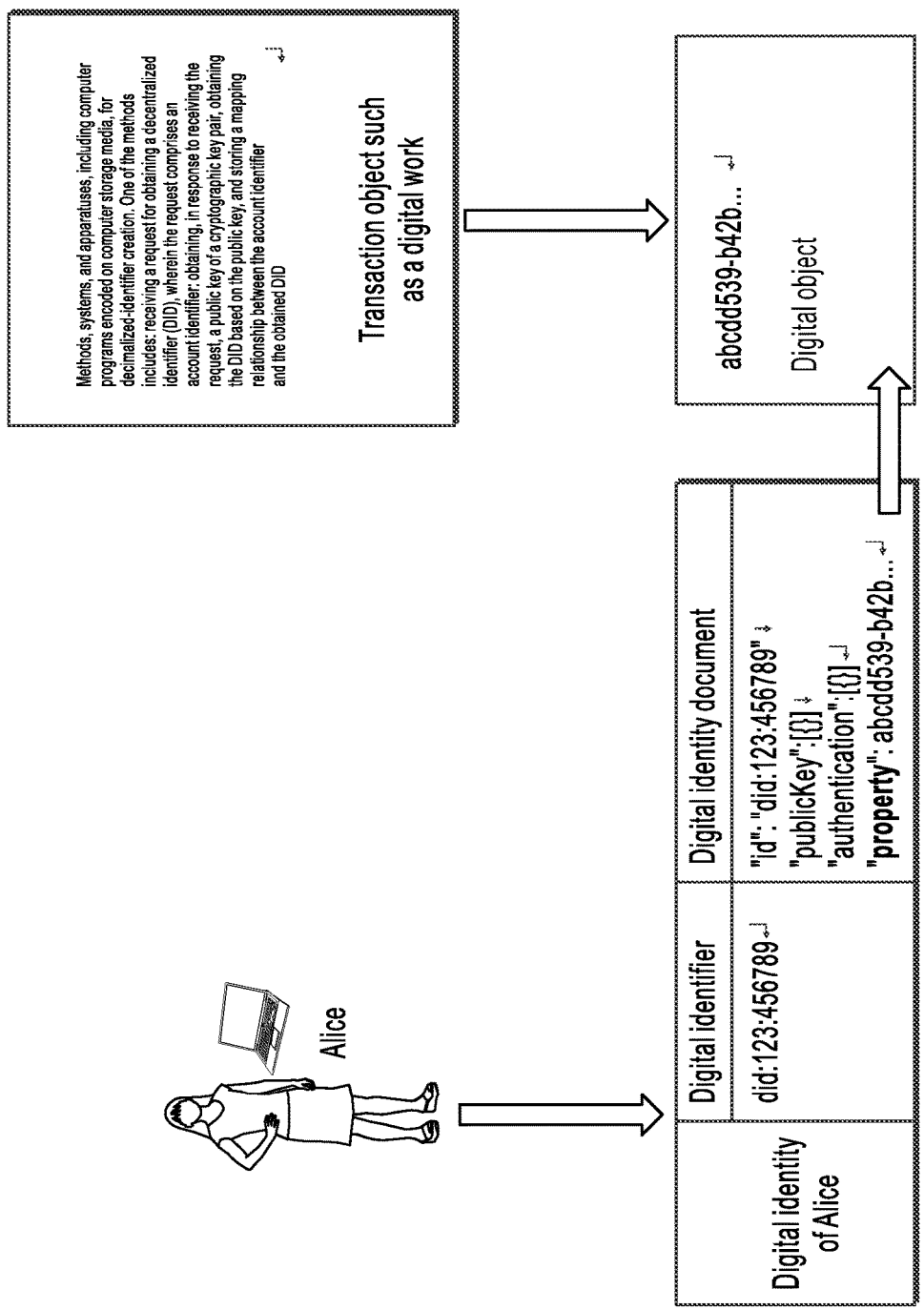
FIG. 5b is a schematic diagram of associating a digital object and a digital identity of its current owner, according to an example embodiment.

FIG. 5b is a schematic diagram of associating a digital object and a digital identity of its current owner, according to an example embodiment. As shown in FIG. 5b, owner "Alice" register a digital identity in a blockchain system, and a digital identifier of Alice is "did:456:123789". In addition to recording several pieces of information related to the digital identity (such as a digital identifier, a public key, and identity authentication information) in a corresponding digital identity document, a "property" field further records a digital object abcdd539-b42b . . . currently owned by "Alice". The digital object has an anchor relationship with a transaction object such as an off-chain digital work, and the "property" field will be correspondingly updated based on a result of the transaction.

Figure 6A:
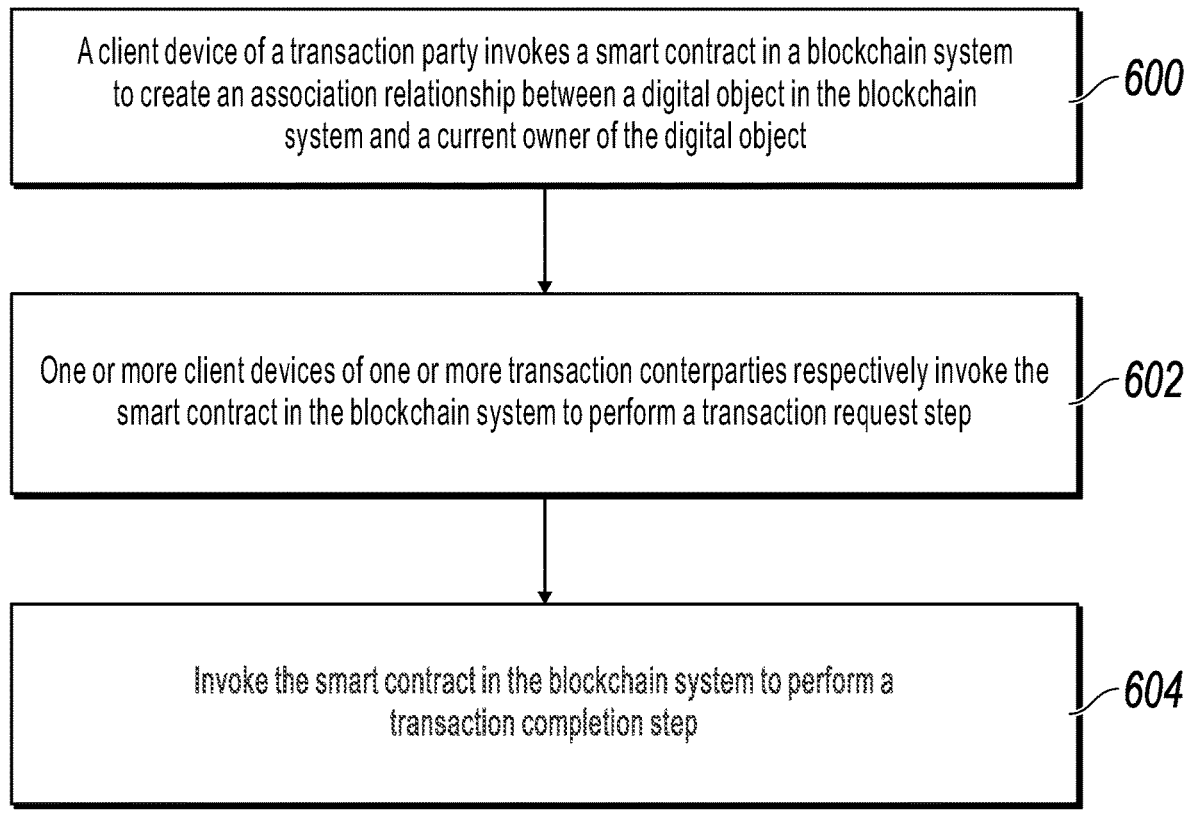
FIG. 6a is a schematic flowchart illustrating another blockchain-based transaction method, according to an example embodiment.

FIG. 6a is a schematic flowchart illustrating another blockchain-based transaction method, according to this specification, including:

S600. A client device of a transaction party invokes a smart contract in a blockchain system to create an association relationship between a digital object in the blockchain system and a current owner of the digital object.

S602. One or more client devices of one or more transaction counterparties respectively invoke the smart contract in the blockchain system to perform a transaction request step.

In some embodiments, that the smart contract performs a transaction request step can include: if it is determined that the transaction counterparty has a transaction request qualification for the digital object, determining a request of a transaction of the transaction counterparty for the digital object. In some other embodiments, when the smart contract performs a transaction request step, there can be no qualification limitation on the request of the transaction.

S604. Invoke the smart contract in the blockchain system to perform a transaction completion step.

The performing a transaction completion step can include: determining a new owner of the digital object based on a result of the transaction, and updating the association relationship.

A main difference between the method shown in FIG. 6a and the method shown in FIG. 4a lies in that in the method shown in FIG. 6a, the digital identity may not be registered for the digital object, and the digital identity may not be registered for the current owner of the digital object, but the association relationship between the digital object in the blockchain system and the current owner of the digital object is created in the smart contract. When the transaction completion step is performed, the association relationship is updated, so as to complete ownership transfer of the digital object.

In addition to the previous main difference, the previous description of the method shown in FIG. 4a is also applicable to the method shown in FIG. 6a. Principles of the embodiments of the method shown in FIG. 6a are similar to those of the embodiments of the method shown in FIG. 4a. For details, references can be made for understanding, and details are omitted here for simplicity.

Figure 6B:
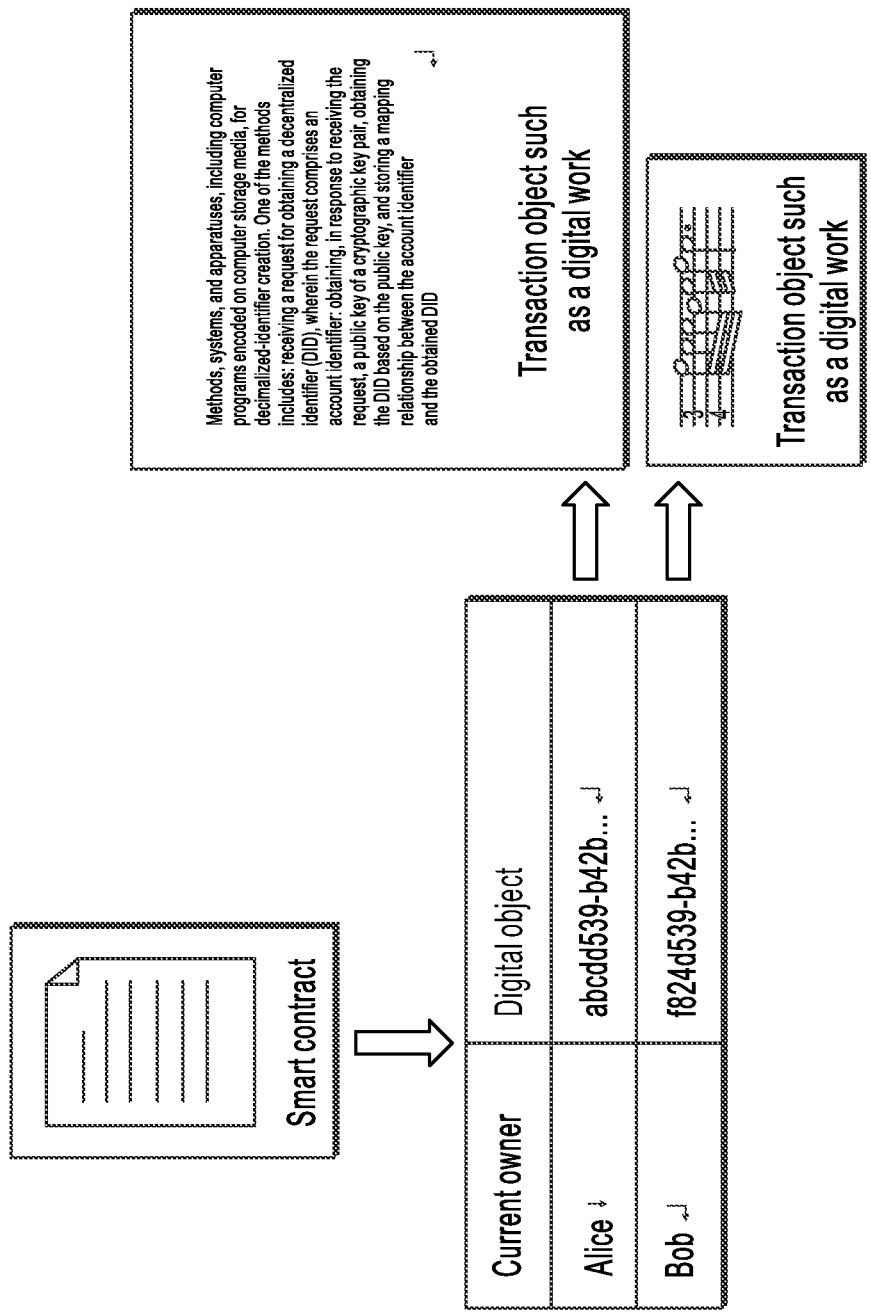
FIG. 6b is a schematic diagram of creating an association relationship between a digital object and its current owner in a smart contract, according to an example embodiment.

FIG. 6b is a schematic diagram of creating an association relationship between a digital object and its current owner in a smart contract, according to an example embodiment. As shown in FIG. 6b, after a client device of a transaction party invokes a smart contract in a blockchain system, an association relationship table between a digital object and a current owner of the digital object is created in the smart contract, a current owner of digital object abcdd539-b42b . . . is "Alice", and a current owner of digital object f824d539-b42b . . . is "Bob". In addition, the digital object has an anchor relationship with a transaction object such as an off-chain digital work, and the association relationship table will be correspondingly updated based on a result of the transaction.

In addition, this specification further provides a blockchain-based transaction system, including a client device of a transaction party, one or more client devices of one or more transaction counterparties, and a blockchain system; where the client device of the transaction party invokes a smart contract in the blockchain system to register a digital identity for a digital object in the blockchain system, where a digital identity document of the digital object includes an owner identity of the digital object;

one or more client devices of the one or more transaction counterparties respectively invoke the smart contract in the blockchain system to execute a request of a transaction; and furthermore, invoke the smart contract in the blockchain system to perform a transaction completion step, determine a new owner of the digital object based on a result of the transaction, and update the owner identity of the digital object included in the digital identity document.

In some embodiments, the blockchain system further includes a client device of an owner; and the client device of the owner can invoke the smart contract in the blockchain system to perform the transaction completion step.

This specification further provides a blockchain-based transaction system, including a client device of a transaction party, one or more client devices of one or more transaction counterparties, and a blockchain system; where the client device of the transaction party invokes a smart contract in the blockchain system to register a digital identity for a current owner of a digital object in the blockchain system, where a digital identity document of the current owner records an ownership of the current owner for the digital object;

one or more client devices of the one or more transaction counterparties respectively invoke the smart contract in the blockchain system to execute a request of a transaction; and furthermore, invoke the smart contract in the blockchain system to perform a transaction completion step, determine a new owner of the digital object based on a result of the transaction, delete the ownership of the current owner for the digital object from the digital identity document of the current owner, and invoke the smart contract in the blockchain system to write an ownership of a new owner for the digital object into a digital identity document of the new owner.

This specification further provides a blockchain-based transaction system, including a client device of a transaction party, one or more client devices of one or more transaction counterparties, and a blockchain system; where the client device of the transaction party invokes a smart contract in the blockchain system to create an association relationship between a digital object in the blockchain system and a current owner of the digital object;

one or more client devices of the one or more transaction counterparties respectively invoke the smart contract in the blockchain system to execute a request of a transaction; and furthermore, invoke the smart contract in the blockchain system to perform a transaction completion step, determine a new owner of the digital object based on a result of the transaction, and correspondingly update the association relationship.

The system, apparatus, module, or unit illustrated in the previous embodiments can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, functions of the units can be implemented in the same or different software or hardware when this specification is implemented.

A person skilled in the art should understand that the embodiments of this specification can be provided as methods, systems, or computer program products. Therefore, this specification can take a form of complete hardware embodiments, complete software embodiments, or embodiments combining software and hardware. Further, this specification can take a form of a computer program product implemented on one or more computer-usable storage media (including but not limited to disk storage, CD-ROM, and optical storage) containing computer-usable program code.

This specification is described with reference to the flowcharts and/or block diagrams of the method, the device (system), and the computer program product based on the embodiments of this specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate an apparatus for implementing a specific function in one or more processes in the flowcharts and/or in one or more blocks in the block diagrams.

This specification can be described in the general context of computer-executable instructions, for example, a program module. Generally, the program module includes a routine, a program, an object, a component, a data structure, etc. executing a specific task or implementing a specific abstract data type. This specification can also be practiced in distributed computing environments. In the distributed computing environments, tasks are performed by remote processing devices connected through a communications network. In a distributed computing environment, the program module can be located in both local and remote computer storage media including storage devices.

These computer program instructions can be stored in a computer readable memory that can instruct the computer or the another programmable data processing device to work in a specific way, so the instructions stored in the computer readable memory generate a product that includes an instruction apparatus. The instruction apparatus implements a specific function in one or more processes in the flowcharts and/or in one or more blocks in the block diagrams.

These computer program instructions can be loaded onto the computer or another programmable data processing device, so a series of operations and operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams. In a typical configuration, the computer includes one or more processors (CPU), input/output interfaces, network interfaces, and memories.

The memory may include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD) or another optical storage, a cassette tape, a magnetic disk storage, a quantum memory, a storage medium based on grapheme, another magnetic storage device, or any other non-transmission medium. The computer storage medium can be used to store information that can be accessed by the computing device. Based on the definition in this specification, the computer readable medium does not include transitory computer readable media (transitory media) such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

In conclusion, in some embodiments disclosed in this specification, a digital object and a digital identity are connected by using a digital identity technology, and the digital identity can further include identity authentication information, so a transaction of the digital object can meet regulatory requirements of KYC. In some embodiments, some or all digital identities are fully real-name authenticated, providing a fully real-name authenticated blockchain-based transaction system. Such a system is conducive to anti-money laundering fraud operation and becomes a truly trustworthy transaction system. In some embodiments, by combining the digital object with a record and verification function attached to the digital identity, transaction elements such as a transaction object and transaction participants can be easily recorded and verified, thereby improving transaction convenience and reliability. In some other embodiments, instead of relying on the digital identity, a client device of a transaction party invokes a smart contract in a blockchain system to create an association relationship table between a digital object and its owner on a blockchain, stores the association relationship table in the smart contract, and further records ownership of the digital object on the blockchain in a trusted method.

A plurality of embodiments of this specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing is feasible or may be advantageous.

Terms used in a plurality of embodiments of this specification are merely used to describe specific embodiments, and are not intended to limit the plurality of embodiments of this specification. The terms "a" and "the" of singular forms used in a plurality of embodiments of this specification and the appended claims are also intended to include plural forms, unless otherwise specified in the context clearly. It should be further understood that the term "and/or" used in this specification indicates and includes any or all possible combinations of one or more associated listed items.

It should be understood that although terms "first", "second", "third", etc. may be used in a plurality of embodiments of this specification to describe various types of information, the information is not limited to these terms. These terms are only used to distinguish between information of the same type. For example, without departing from the scope of a plurality of embodiments of this specification, first information can also be referred to as second information, and similarly, the second information can be referred to as the first information. Depending on the context, for example, the word "if" used here can be explained as "while", "when", or "in response to determining".

The embodiments in this specification are described in a progressive way. For same or similar parts of the embodiments, references can be made to the embodiments. Each embodiment focuses on a difference from other embodiments. Particularly, a device embodiment is similar to a method embodiment, and therefore is described briefly. For a related part, references can be made to some descriptions in the method embodiment. The previously described apparatus embodiments are merely examples. The modules described as separate parts can or cannot be physically separate. During embodiment of the solutions in the embodiments of the present application, functions of the modules can be implemented in one or more pieces of software and/or hardware. Some or all of the modules can be selected based on an actual need to implement the solutions in the embodiments. A person of ordinary skill in the art can understand and implement the embodiments of the present application without creative efforts.

The previous descriptions are only example embodiments of a plurality of embodiments of this specification, but are not intended to limit the plurality of embodiments of this specification. Any modification, equivalent replacement, improvement, etc. made without departing from the spirit and principle of the plurality of embodiments of this specification shall fall within the protection scope of the plurality of embodiments of this specification.

What is claimed is:

1. A computer-implemented method, comprising:
    invoking, by a computer system, a first smart contract in a blockchain system to register a first digital identity for a digital object in the blockchain system, wherein the first digital identity for the digital object comprises a digital identifier of the digital object and a digital identity document of the digital object, and the digital identity document of the digital object comprises an identifier of an owner of the digital object and a public key of the owner; and
    in response to a request to execute a transaction of the digital object, invoking, by the computer system, a second smart contract in the blockchain system to perform a transaction completion step, wherein performing the transaction completion step comprises:
        performing, based on a public key of a transaction party of the transaction of the digital object in the digital identity document of the digital object or a digital identity document of the transaction party of the transaction, a verification of a signature submitted by the transaction party to invoke the second smart contract in the blockchain system to perform the transaction completion step, wherein the transaction party is registered with a second digital identity in the blockchain system, wherein the second digital identity for the transaction party comprises the digital identity document of the transaction party that records trusted identity information of the transaction party, and the digital identity document of the transaction party comprises an identifier of the transaction party and the public key of the transaction party;
        in response to determining that the verification succeeds, determining a new owner of the digital object based on a result of the transaction, wherein the new owner is registered with a third digital identity in the blockchain system, wherein the third digital identity for the new owner comprises a digital identity document of the new owner that records trusted identify information of the new owner, and the digital identity document of the new owner comprises an identifier of the new owner and a public key of the new owner; and
        updating the identifier of the owner of the digital object comprised in the digital identity document of the digital object to reflect the new owner of the digital object.

2. The method according to claim 1, wherein the first smart contract includes different functions from the second smart contract.

3. The method according to claim 1, wherein the first smart contract includes same functions as the second smart contract.

4. The method according to claim 1, wherein the computer system comprises a client device of the transaction party of the transaction, and wherein the transaction party is the owner of the digital object, or the transaction party is a transaction agent that acts on behalf of the owner of the digital object.

5. The method according to claim 4, wherein the verification of the signature submitted by the transaction party to invoke the second smart contract in the blockchain system to perform the transaction completion step is performed based on the public key of the owner of the digital object in the digital identity document of the digital object.

6. The method according to claim 4, further comprising:
    notifying, by the client device of the transaction party to the transaction party, a monitored event message corresponding to the request to execute the transaction of the digital object;
    determining a transaction counterparty; and
    wherein determining the new owner of the digital object based on the result of the transaction comprises determining the new owner of the digital object to be the transaction counterparty.

7. The method according to claim 4, further comprising:
    obtaining, by the client device of the transaction party, a monitored event message corresponding to the request to execute the transaction of the digital object;
    determining a transaction counterparty; and
    wherein the second smart contract in the blockchain system is invoked to perform the transaction completion step based determining the transaction counterparty.

8. The method according to claim 4, further comprising:
    determining a transaction counterparty, wherein the transaction counterparty is verified to have a transaction request qualification for the digital object.

9. The method according to claim 8, wherein performing the second smart contract comprises:
    performing a second verification, using a public key of the transaction counterparty included in a digital identity document of the transaction counterparty, of a signature submitted by the client device of the transaction counterparty; and
    in response to determining that the second verification succeeds, determining that the transaction counterparty has the transaction request qualification for the digital object.

10. The method according to claim 8, further comprising:
    invoking, by the client device of the transaction party, the first smart contract in the blockchain system to set the digital object to a tradable state or a non-tradable state.

11. The method according to claim 10, wherein the transaction counterparty is verified to have a transaction request qualification for the digital object comprises the transaction counterparty is verified to have the transaction request qualification for the digital object in response to determining that the digital object is set to the tradable state.

12. The method according to claim 10, wherein setting the digital object to the tradable state or the non-tradable state comprises:
performing a verification of a signature submitted by the client device of the transaction party to perform an object management step; and
in response to determining that if the verification succeeds, setting the digital object to the tradable state or the non-tradable state.

13. The method according to claim 1, wherein the computer system comprises a client device of a transaction counterparty of the transaction.

14. The method according to claim 13, further comprising:
invoking, by the client device of the transaction counterparty, a third smart contract in the blockchain system to execute the request to execute the transaction of the digital object, wherein the third smart contract triggers an event message corresponding to the request to execute the transaction, wherein the event message is monitored by the client device of the transaction party.

15. The method according to claim 13, wherein the request to execute the transaction of the digital object is selected from one of one or more requests to execute transactions of the digital object invoked by one or more client devices of one or more transaction counterparties.

16. The method according to claim 13, further comprising:
invoking, by the client device of the transaction counterparty, a fourth smart contract in the blockchain system to register a digital identity of the transaction counterparty, wherein the digital identity document of the transaction counterparty comprises a public key of the transaction counterparty.

17. The method according to claim 1, wherein the digital object is issued on a blockchain by invoking a fifth smart contract in the blockchain system.

18. The method according to claim 17, wherein invoking the fifth smart contract in the blockchain system to issue the digital object on the blockchain comprises:
if it is determined that a signature submitted by the computer system for invoking the fifth smart contract in the blockchain system to issue the digital object on the blockchain has passed verification, issuing the digital object on the blockchain.

19. The method according to claim 18, wherein the blockchain system comprises a first blockchain system and a second blockchain system, and the fifth smart contract is deployed on the first blockchain system for issuing the digital object, and the first smart contract is deployed on the second blockchain system for registering the first digital identity.

20. The method according to claim 1, wherein the first digital identity is a decentralized identifier.

21. The method according to claim 1, wherein the digital object is used to anchor a transaction object off the blockchain system.

22. The method according to claim 21, wherein the transaction object comprises a physical object, a digital work, or a property interest.

23. The method according to claim 21, wherein the digital object is a non-fungible token.

24. The method according to claim 1, wherein determining the new owner of the digital object comprises:
selecting a qualified transaction request that meets a predetermined requirement from a plurality of transaction requests; and
determining a transaction counterparty corresponding to the qualified transaction request as the new owner of the digital object.

25. A computer-implemented method, comprising:
invoking a first smart contract in a blockchain system to register a first digital identity for a current owner of a digital object in the blockchain system, wherein the first digital identity for the current owner of the digital object comprises a digital identity document of the current owner that records an ownership of the current owner for the digital object, and the digital identity document of the current owner comprises an identifier of the current owner of the digital object and a public key of the current owner, wherein the digital object is registered with a second digital identity in the blockchain system, the second digital identity comprises a digital identity document of the digital object, and the digital identity document of the digital object comprises an identifier of an owner of the digital object and a public key of the owner of the digital object;
in response to a request to execute a transaction of the digital object, invoking a second smart contract in the blockchain system to perform a transaction completion step;
determining a new owner of the digital object based on a result of the transaction, wherein the new owner is registered with a third digital identity in the blockchain system, wherein the third digital identity comprises a digital identity document of the new owner that records trusted identify information of the new owner, and the digital identity document of the new owner comprises an identifier of the new owner and a public key of the new owner;
deleting the ownership of the current owner for the digital object from the digital identity document of the current owner; and
invoking a third smart contract in the blockchain system to write an ownership of the new owner for the digital object into the digital identity document of the new owner.

26. A computer-implemented method, comprising:
registering a first digital identity for a transaction party in a blockchain system, wherein the first digital identity for the transaction party comprises a first digital identity document of the transaction party that records trusted identify information of the transaction party, and the first digital identity document for the transaction party comprises an identifier of the transaction party and a public key of the transaction party;
registering a second digital identity for a transaction counterparty in the blockchain system, wherein the second digital identity for the transaction counterparty comprises a second digital identity document of the transaction counterparty that records trusted identify information of the transaction counterparty, and the second digital identity document for the transaction counterparty comprises an identifier of the transaction counterparty and a public key of the transaction counterparty;
registering a third digital identity for a digital object in the blockchain system, wherein the third digital identity for the digital object comprises a third digital identity document of the digital object, and the third digital identity document of the digital object comprises an identifier of an owner of the digital object and a public key of the owner of the digital object; and in response to a request to execute a transaction of the digital object, performing a transaction completion step, wherein performing the transaction completion step comprises:
  performing one or more verifications based on one or more of the public key of the transaction party in the first digital identity document of the transaction party, the public key of the transaction counterparty in the second digital identity document of the transaction counterparty, or the public key of the owner of the digital object in the third digital identity document of the digital object;
  in response to determining that the one or more verifications succeed, determining a new owner of the digital object based on a result of the transaction; and
  updating the third digital identity document of the digital object to reflect the new owner of the digital object.

* * * * *